United States Patent [19]

Wootton et al.

[11] 4,360,629
[45] Nov. 23, 1982

[54] NONSOLVENT PRECONCENTRATION OF POLYMERIC CYCLOOLEFINS

[75] Inventors: Gerald V. Wootton, Akron; Parley C. Lane, Jr., Cuyahoga Falls; Kong S. Yi, Parma, all of Ohio

[73] Assignee: The B. F. Goodrich Company, Akron, Ohio

[21] Appl. No.: 337,547

[22] Filed: Jan. 6, 1982

[51] Int. Cl.$^3$ ............................................. C08K 5/01
[52] U.S. Cl. ................................................... 524/553
[58] Field of Search ....................................... 524/553

[56] References Cited

U.S. PATENT DOCUMENTS 3,980,626 9/1976 Hepworth ........................... 524/553
4,028,482 6/1977 Ueshima et al. .................... 526/271
4,324,717 4/1982 Layer .................................. 524/553

Primary Examiner—Joseph L. Schofer
Assistant Examiner—N. Sarofim
Attorney, Agent, or Firm—George A. Kap

[57] ABSTRACT

Process for preconcentrating polymer cement normally containing about 15% solids comprising mixing therewith an amount of a hydrocarbon nonsolvent liquid sufficient to form a two-phase system but insufficient to precipitate the polymer, and separating the two phases; the polymer cement is a honey-like solution of a polymer prepared by ring opening polymerization of at least one monomer containing the norbornene group in a nonpolar hydrocarbon solvent; the upper phase being a thin hydrocarbon liquid comprising nonsolvent, a substantial portion of the nonpolar solvent in the polymer cement, and impurities, and the lower phase being a preconcentrated polymer cement containing at least 20% solids.

10 Claims, No Drawings

NONSOLVENT PRECONCENTRATION OF POLYMERIC CYCLOOLEFINS

BACKGROUND OF THE INVENTION

In the solution polymerization of cycloolefins, the product discharged from the reactor is a honey-like cement that consists principally of a nonpolar carrier solvent, such as toluene or cyclohexane, in which the polymer is dissolved. The polymer content is normally on the order of about 15% by weight. The polymer can be any of the family of polymers that are made by homopolymerization or copolymerization of one or more of cycloolefins that contain the norbornene group.

After the honey-like cement is prepared, it is necessary to separate the polymer from its carrier solvent. In the past, steam stripping has been used exclusively in plant operations to extract the polymer from the carrier solvent. In steam stripping, the cement is injected into a jet of steam that is directed into a vessel containing hot water. As contact is made between the cement and a jet of steam, the carrier solvent is flashed off as vapor, depositing the polymer in particle form in the hot water.

Steam stripping has a number of serious disadvantages. It produces a product of relatively large, coarse and a variable particle size. The product contains a substantial amount of occluded water that makes it extremely difficult to dry. It produces a product that retains significant quantities of residual monomers and other residues that include high boiling reaction products and catalyst residue, all of which adversely affect the quality of the final product. Steam stripping has the inherent carry-over problem of polymer fines with the solvent vapor and steam that is continuously discharged. This carry-over results in severe plugging in the solvent recovery system. Finally, steam stripping requires large volumes of steam, far in excess of that required to vaporize the solvent in order to produce a particulate product. Steam stripping, therefore, is an inefficient, expensive, and energy-wasteful operation.

It has been a common practice to reduce impurities in the polymers of cycloolefins by water-washing the polymers. In this way, all or most of the water-soluble impurities are removed with the water. Water-washing has not been practical since large volumes of contaminated water was produced that had to be disposed without creating an environmental problem.

More recently, an alternate approach was discovered for isolating polymers of cycloolefins from the carrier solvent. Pursuant to this approach, the cement is mixed with a nonsolvent in the volume ratio of about 3 to 1, nonsolvent to cement, in a high shear mixer whereby the polymer precipitates out. A nonsolvent is a liquid that is miscible with the nonpolar solvent that is used in the polymerization reaction but is a nonsolvent for the polymer. Although on some occasions this recovery procedure produced granular, easy-to-dry product having bulk density of about 9 lb/ft$^3$, these results could not be reliably reproduced. What was obtained normally was a clump-like product of fine, irregular fluffy microfibers that pack cotton-like when filtered and are difficult to dry, the dry product having bulk density below 5 lb/ft$^3$. When polymer cement is precipitated or coagulated in a nonsolvent medium, the high polymers appear to precipitate from and the oligomers remain solubilized in the nonsolvent medium. Since a substantial portion of the impurities are soluble in the nonsolvent, this recovery process succeeded in removing the bulk of the impurities from the polymer, however, this approach was not entirely successful since large volumes of contaminated liquid was produced composed primarily of nonsolvent, nonpolar or reaction solvent, and impurities that included residual shortstop for the polymerization reaction, adducts of the shortstop with catalyst residues, residual catalyst components, oligomers, etc. Solvent recovery of the large volume of nonsolvent—solvent liquid is difficult and expensive.

As already described, mixing large volume of nonsolvent with the polymer cement caused precipitation of polymer in a fluffy, clump-like mass. Since it was anticipated that such a fluffy, clumpy product would cause processing and handling difficulties, an idea was conceived that addition of a small amount of a nonsolvent might facilitate nucleation of the polymer and subsequent precipitation of the polymer in a granular or other form that is preferred to the fluffy, clump-like mass. An experiment was carried out by mixing a honey-like polymer cement with 30% by volume, based on the volume of the cement, of ethanol. The cement was a 15% total solids solution of polymeric cycloolefins in cyclohexane. Unexpectedly, a two-phase system formed, the upper phase being a thin hydrocarbon liquid and the lower phase being a viscous, gel-like cement. Also unexpected was the fact that the lower phase had solids concentration of about 35% and that about 70% of the cyclohexane solvent was extracted with only 5% of the nonsolvent that is required for precipitation of the polymer from polymer cement.

SUMMARY OF THE INVENTION

This invention relates to preconcentration of cements of polymeric cycloolefins containing the norbornene group with a small amount of a nonsolvent, the cement being of a honey-like consistency comprising on the order of about 15% polymer solids with remainder being a carrier solvent. Amount of the nonsolvent should be sufficient to preconcentrate the polymer cement in a more viscous form but insufficient to precipitate same in a solid form. The preconcentration is accomplished by mixing 100 parts by volume of the polymer cement with 5 to 100 parts by volume of a nonsolvent whereby, in a preferred embodiment, a two phase system is formed, the upper phase being a thin hydrocarbon liquid containing more than half of the carrier solvent and the lower being a viscous, gel-like cement concentrated from about 15% to at least 20% and as high as about 80% total solids. The upper phase is drawn off and is subjected to solvent recovery whereas the lower phase is removed and the polymer is refined by initially mixing it with a large volume of a nonsolvent to cause precipitation of the polymer followed by other refining steps. The nonsolvent, which is miscible with the carrier solvent but is a nonsolvent for the polymer, is selected from alcohols, aldehydes, lower carboxylic acids, ketones, acetates, mixtures thereof, water azetropes thereof, and other water mixtures thereof.

DETAILED DESCRIPTION OF THE INVENTION

Polymers of cyclic olefins that contain the norbornene moiety can be made by ring opening polymerization of the cyclic olefins in the presence of a metathesis catalyst comprising at least one alkylaluminum halide cocatalyst and at least one tungsten or molybdenum compound catalyst. Tungsten and molybdenum in the metal compound catalyst can be the cation, such as in a tungsten or molybdenum halide, or the anion as in a tungstate or a molybdate. Polymerization is accomplished by mixing in a reactor a monomeric cyclic olefin, or a mixture thereof with or without other copolymerizable monomers, with a nonpolar hydrocarbon solvent. A molecular weight modifier, selected from nonconjugated acyclic olefins, is then added to the reactor followed by an alkylaluminum halide cocatalyst and a tungsten or molybdenum compound catalyst. The polymerization reaction is conducted at 0° to 200° C., preferably 25° to 100° C., with stirring and produces little heat. Reaction time to completion is on the order of less than 2 hours. Reaction product that is recovered directly from the reactor is a smooth, viscous cement of honey-like consistency that comprises a polymer dispersed in a solvent. Polymer or solids concentration in the cement is about 15% and dilute solution viscosity of the polymer is normally in the range of about 0.1 to 3. Dilute solution viscosity is a measure of viscosity of a solution of 0.25 gram of polymer in one deciliter of toluene at 25° C.

The norbornene-type monomers or cycloolefins that can be polymerized in accordance with the process described herein are characterized by the presence of the norborene group, defined structurally by the following formula I:

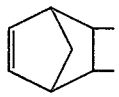
(I)

Pursuant to this definition, suitable norbornene-type monomers include substituted and unsubstituted norbornenes, dicyclopentadienes, dihydrodicyclopentadienes, trimers of cyclopentadiene, and tetracyclododecenes. Preferred monomers of the norbornene-type are those defined by the following formulas II and III:

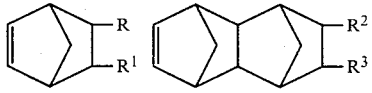

(II)        (III)

where R and $R^1$ are independently selected from hydrogen, alkyl groups of 1 to 20 carbon atoms, and saturated and unsaturated hydrocarbon cyclic groups formed by R and $R^1$ together with the two ring carbon atoms connected thereto containing 4 to 7 carbon atoms. In a preferred embodiment, R and $R^1$ are independently selected from hydrogen, alkyl groups of 1 to 3 carbon atoms, and monounsaturated hydrocarbon cyclic groups containing 5 carbon atoms, the cyclic group being formed by R and $R^1$ as well as by the two carbon atoms connected to R and $R^1$. In reference to formula III, $R^2$ and $R^3$ are independently selected from hydrogen and alkyl groups containing 1 to 20 carbon atoms, preferably 1 to 3 carbon atoms. Examples of monomers referred to herein include dicyclopentadiene, methyltetracyclododecene, 2-norbornene and other norbornene monomers such as 5-methyl-2-norbornene, 5,6-dimethyl-2-norbornene, 5-isopropyl-2-norbornene, 5-ethyl-2-norbornene, 5-butyl-2-norbornene, 5-hexyl-2-norbornene, 5-octyl-2-norbornene, and 5-dodecyl-2-norbornene.

Especially contemplated herein are homopolymers, copolymers and terpolymers of methylnorbornene, methyltetracyclododecene, and dicyclopentadiene, and preferably homopolymers of methyltetracyclododecene and copolymers of methyltetracyclododecene and methylnorbornene. The copolymers contain 1 to 75% by weight, preferably 10 to 30%, of polymerized methylnorbornene with remainder being methyltetracyclododecene whereas the terpolymers contain 1 to 75% by weight, preferably 1 to 45%, of polymerized methylnorbornene and 25 to 98% by weight, preferably 50 to 98%, of polymerized methyltetracyclododecene, with remainder being polymerized dicyclopentadiene. The norbornene-type monomers, or a mixture thereof can contain up to about 20% by weight of at least one other copolymerizable monomer.

The preferred catalyst employed in the dispersion of cycloolefins is a combination of an aluminum halide with elemental halide or an alkylaluminum halide cocatalyst and a tungsten or a molybdenum compound catalyst. The tungsten and molybdenum in the metal compound catalyst can be the cation, such as in a tungsten or a molybdenum halide, or the anion, as in a tungstate or a molybdate.

The useful molybdenum and tungsten compound catalysts include molybdenum and tungsten halides such as molybdenum petachloride, molybdenum hexachloride, molybdenum pentabromide, molybdenum hexafluoride, molybdenum pentaiodide, tungsten hexachloride, tungsten hexafluoride, and the like. Preferred catalysts are the molybdenum halides, especially molybdenum pentachloride.

The alkylaluminum halide cocatalysts are selected from monoalkylaluminum dihalides $RAlX_2$, dialkylaluminum monohalides $R_2AlX$, aluminum sesquihalides $R_3Al_2X_3$m trialkylaluminum $R_3Al$, aluminum trihalide $AlX_3$, and mixtures thereof. In the formulas for the alkylaluminum halide catalysts, R is an alkyl radical containing 1 to 12 carbon atoms, preferably about 2 to 4 carbon atoms, and X is a halogen selected from chlorine, iodine, bromine and fluorine. Specific examples of such alkyl aluminum halides include ethylaluminum dichloride, diethylaluminum monochloride, ethylaluminum sesquichloride, diethylaluminum iodide, ethylaluminum diiodide, trialkylaluminum compound with elemental iodine, propylaluminum dichloride, propylaluminum diiodide, isobutylaluminum dichloride, ethylaluminum dibromide, methylaluminum sesquichloride, and methylaluminum sesquibromide.

Although aluminum is the preferred reducing agent in the alkylaluminum halide cocatalysts, other organometallic halide reducing agents can function as well. Metals that form suitable organometallic cocatalysts include lithium, magnesium, boron, lead, zinc, tin, silicon and germanium. Also, the metallic hydrides can be substituted in whole or in part for the organometallic cocatalysts.

The molybdenum or tungsten compound catalyst, or a mixture thereof, is employed at a level of about 0.01 to 50 millimoles molybdenum or tungsten per mole of total monomer, preferably 0.1 to 10 millimoles. The molar ratio of the alkylaluminum halide to the molybdenum and/or tungsten compound catalyst is not critical and can be in the range of about 200:1 or more to 1:10, preferably from 10:1 to 2:1 of aluminum to molybdenum or tungsten.

The use of a polymerization reaction solvent in the process of this invention is preferred but not required. Suitable nonpolar solvents, in which the polymers described herein are soluble, include aliphatic and cycloaliphatic hydrocarbon solvents containing 4 to 10 carbon atoms such as butane, pentane, hexane, heptane, octane, cyclohexane, cyclohexene, cyclooctane and the like; aromatic hydrocarbon solvents containing 6 to 14 carbon atoms which are liquid or easily liquified such as benzene, toluene, naphthalene and the like; and substituted hydrocarbons wherein the substituents are inert, such as dichloromethane, chloroform, chlorobenzene, dichlorobenzene, and the like. Cyclohexane was found to be an excellent solvent. The polymer need not be soluble in the solvent. The solvent can be added at any point in the charging procedure, but a portion, preferably 0.1 to 10% of the total solvent, is used to dissolve the catalyst and the remainder added before the catalyst solution. Generally ½ to 2 liters of solvent is used per 100 grams of monomer.

A polymerization activator can be used but is generally not needed. Activation can be obtained by using air or a peroxide or a hydroperoxide, especially the organic peroxides such as benzoyl peroxide. The activator can be employed in the range of up to 3 moles, preferably up to 1 mole, per mole of the alkylaluminum halide cocatalyst. The activator can be added at any point in the charging procedure but is preferably added last or with the tungsten or molybdenum compound catalyst.

At least one nonconjugated acyclic olefin can be used as a molecular weight modifier having at least one hydrogen on each double-bonded carbon atom and containing 2 to 12 carbon atoms, more preferably 3 to 8 carbon atoms. Inert substituents on the remaining carbon atoms can be hydrogens and/or alkyl groups containing 1 to 8 carbon atoms. Examples of suitable acyclic olefins include 1-olefins, 2-olefins, 3-olefins, nonconjugated diolefins, and nonconjugated triolefins. More preferably, the nonconjugated acyclic olefins are selected from the group consisting of 1-olefins and 2-olefins containing 3 to 8 carbon atoms such as 1-butene, 3-methyl-1-butene, 2-pentene, 4-methyl-2-pentene, and the like. Compounds not having hydrogen atoms on double-bonded carbons are unreactive in this invention. Even conjugated olefins such as butadiene, isoprene and the like are active modifiers.

The nonconjugated acyclic olefin can be used at a level of about 0.0001 to 1 mole per mole of the monomer charge. The nonconjugated acyclic olefin can be charged directly or in solution at any point in the charging procedure, but it is preferably charged along with the monomers. When charged last, the nonconjugated acyclic olefin is preferably charged before the reaction begins.

The monomers can be added at any point in the charging procedure. Normally, however, the monomers, the solvent and the nonconjugated acyclic olefin are added first to the reactor. The ingredients can be added separately or as a mixture thereof. The alkylaluminum halide cocatalyst and the tungsten or molybdenum compound catalyst are added next separately, in a hydrocarbon solvent. Completion of the polymerization reaction is indicated by the disappearance of the monomer in the charge, as monitored by gas chromatography.

The invention described herein relates to the preconcentration of the honey-like polymer cement that is obtained from the reactor at the conclusion of the polymerization reaction. Preconcentration is an extractive procedure that precedes final precipitation of the polymer and subsequent refining steps that include drying and compounding of the polymer. The cement contains a small amount of polymer dispersed in a solvent. Total solids concentration in the cement is on the order of about 15% by weight, although it can be much higher.

The cement also includes impurities such as unreacted monomers, and monomer impurities, residual catalyst components and molecular weight modifiers, adducts of the molecular weight modifiers with the catalyst components, low molecular weight reaction products, and the like. It is estimated that amount of the impurities is in excess of 2 parts per 100 parts of the polymer cement. It is desired that most of the impurities be removed since they adversely affect quality of the polymer and limit or render impractical certain of the refining operations, including solvent recovery.

To effect the preconcentration of the polymer cement, a small amount of a nonsolvent is mixed therewith that results in formation of two distinct phases: the upper phase being a thin hydrocarbon liquid and the lower phase being a more concentrated, gel-like cement, that will, hereinafter, be referred to as preconcentrate polymer cement. The surprising and unexpected result of mixing a small amount of a nonsolvent with polymer cement resides in the fact that more than half, and as much as about 70%, of the solvent in the polymer cement is extracted by the small amount of the nonsolvent. Furthermore, since most of the impurities are soluble in the nonsolvent, they can be easily isolated from the preconcentrated polymer cement by decanting the upper phase. Mixing of the polymer cement with a nonsolvent can be made in the temperature range between the freezing and boiling temperatures of the system. This means that either the polymer cement nor the nonsolvent, or both, can be at ambient temperature or heated or cooled within the defined temperature range before or after the mixing to effect preconcentration. It appears that preconcentration is enhanced at elevated temperature of up to about 60° C. and this may be due in part to the fact that viscosity is reduced at higher temperatures which facilitates phase separation. Preferred preconcentration temperature, therefore, is between room temperature of about 20° C. to about 60° C.

The invention disclosed herein, therefore, provides for preconcentration of the polymer and extraction of most of the carrier solvent and the impurities by merely mixing a small amount of a nonsolvent with a polymer cement whereby a two phase system is formed wherein the upper hydrocarbon liquid phase is decanted leaving a preconcentrated cement as the lower phase. This invention, however, contemplates more than two phases in the system, one of which is the preconcentrated cement phase disposed either below or above the thin hydrocarbon phase, preferably below. The ratio of nonsolvent to polymer cement that can be employed to successfully preconcentrate the cement and extract the major portion of the solvent depends on total solids in the polymer cement, particular solvent used in the polymerization reaction, the polymer composition, molecular weight of the polymer, the particular nonsolvent employed, and probably other factors.

The invention described herein can be carried out in a batch operation or continuously. Of particular interest is the continuous operation that is conducted countercurrently by passing the polymer cement through a series of vessels from one end while simultaneously passing the nonsolvent from the opposite end.

For purposes described herein, the ratio of nonsolvent to polymer cement has been determined to be in the range of 5 to 100 volume parts, preferably 20 to 60 parts, of nonsolvent to 100 volume parts of the cement. More nonsolvent is normally required to concentrate cements containing low molecular weight polymer. Generally speaking, a sufficient amount of a nonsolvent should be used to form a two-phase system and to preconcentrate the cement but an insufficient amount to precipitate the polymer in solid form.

The greatly reduced volume of nonsolvent/solvent liquid containing most of the impurities can be subjected to solvent recovery at a fraction of the previous energy cost. Furthermore, extraction of oligomers and other impurities from the cement in the concentration step yields a cleaner product with improved properties and color. The extent of impurities removal appears to be independent of the amount of nonsolvent used. Based on empirical data, it was observed that amount of impurities extracted was on the same order of magnitude at nonsolvent volume levels of 35% as at 600%.

A single treatment of polymer cement with a small amount of a nonsolvent generally preconcentrates the cement from about 15% total solid up to about 40%, preferably to about 20 to 35% total solids. More than one treatment of a cement can be made with the result that more concentrated cements are formed. In this manner, cements of up to about 80% total solids concentration can be produced. Although preconcentrated polymer cements of up to about 40% total solids can be pumped and handled without any serious problems, it becomes progressively more difficult to handle more viscous or more concentrated cements. Nevertheless this invention contemplates the production of highly concentrated cements containing 40 to 80% total solids that can be processed in a devolatilizing extruder whereby the cement is ultimately extruded and pelletized. Preconcentrated cements of lower solids concentration, i.e., below about 40% total solids, and preferably in the range of 20 to 35% total solids, are subjected to precipitation followed by additional refining steps. The precipitation is accomplished by mixing a preconcentrated cement with 2 to 15, preferably 3 to 6 volumes of a nonsolvent per one volume of the cement whereby the polymer precipitates out in solid, fluffy clumps consisting of numerous intertwined microfibers. The nonsolvent used in the precipitation operation can be the same as or different from the nonsolvent used in the preconcentration of polymer cement, described earlier.

The nonsolvent is a hydrocarbon liquid that is miscible with the nonpolar solvent used in the polymerization reaction of the monomers containing the norbornene group, however, the nonsolvent is not a solvent for the polymer. Suitable nonsolvents include alcohols containing 1 to 8 carbon atoms, preferably lower alkyl alcohols of about 1 to 4 carbon atoms; aldehydes containing 2 to 6, preferably 2 to 4 carbon atoms; lower carboxylic acids containing 2 to 8, preferably 2 to 4 carbon atoms; ketones containing 3 to 12, preferably 3 to 5 carbon atoms; and acetates containing 3 to 8, preferably 3 to 6 carbon atoms. Mixtures and water mixtures of these substances are included, such as water azeotropes thereof especially those of alcohols, such as ethanol azeotrope containing 4% water and isopropanol azetrope containing approximately 12.5% water by weight. Specific examples of suitable nonsolvents include methanol, ethanol, isopropanol, acetone, dimethyl ketone, methyl ethyl ketone, dimethyl ketone, methyl isopropyl ketone, acetaldehyde, isobutyraldehyde, trimethylacetaldehyde, dimethylethylacetaldehyde, propionaldehyde, methyl acetate, ethyl acetate, and mixtures thereof with or without water.

Amount of the nonsolvent that is needed can be determined empirically. As a general guideline, the amount of nonsolvent mixed with the preconcentrated polymer cement should be enough to preconcentrate the polymer and to form a two-phase system, the upper phase being a thin hydrocarbon liquid and the lower phase being the preconcentrated polymer as a viscous phase. The amount of nonsolvent should not be so great as to precipitate the polymer since it would defeat the purpose of the preconcentration step by creating large volumes of hydrocarbon liquid comprising nonpolar solvent, nonsolvent, and impurities. As already discussed, large volumes of hydrocarbon liquid would have to be subjected to costly solvent extraction operation to recover the nonsolvent, which should be avoided.

In carrying out preconcentration of the polymer cement, a small amount of a nonsolvent can be mixed, at room temperature, with the cement in a vessel whereby the cement quickly separates into two distinct phases. The upper phase, comprised of most of the nonsolvent and at least one-half of the reaction nonpolar solvent with impurities dissolved and/or dispersed therein, is withdrawn from the top and pumped to solvent recovery. Since the upper phase contains only a relatively small amount of the nonsolvent, the solvent recovery system can be carried out more quickly and more efficiently. Recovered solvent and nonsolvent can be recycled to the process whereas the impurities are discarded following removal by distillation or other separation means. The lower phase is a preconcentrated, viscous cement polymer that can be further concentrated by mixing it with more of the nonsolvent. Initial concentration step increases total solids of the polymer cement from about 15% to about 20–35% and subsequent concentration steps can be carried out to increase solids to about 80%.

Following initial or subsequent preconcentration of the polymer cement, the lower phase or preconcentrated cement can thereafter be mixed with a relatively large volume of a nonsolvent in order to precipitate the polymer. Amount of nonsolvent at this stage is at least 2 to 1 and generally about 3:1 to 6:1 volumes of nonsolvent to the preconcentrated polymer cement. The polymer precipitates out in the form of fluffy clumps composed of a multitude of tangled fibrous strands that are normally smaller than 1 millimeter in length. The polymer is compounded with various additives.

The polymers described herein can be injection molded to produce machine parts, containers, electronic components, etc., or they can be extruded into profile shapes, sheets, rods, tubular products, and other mechanical products obtained by pressing, stamping, and other fabricating means. It should be understood, however, that prior to fabrication, the polymers described herein are compounded in a manner that is well known in the art.

The following examples are set forth to illustrate the invention disclosed herein in greater detail in reference to the use of specific materials and conditions.

EXAMPLE 1

A honey-like polymer cement containing about 15% by weight solids was preconcentrated at room temperature by admixing therewith 15% by volume of denatured ethanol. The polymer cement was a cyclohexane solution of a polymer prepared by ring opening polymerization of dicyclopentadiene, methylnorbornene and methyltetracyclododecene. Dilute solution viscosity of the polymer was 0.7 and its composition was 55% dicyclopentadiene, 15% methylnorbornene, and 30% methyltetracyclododecene, on weight basis.

The preconcentration procedure involved charging with mixing five gallons of the polymer cement and 15% by volume of denatured alcohol to a 10-gallon vessel fitted with an agitator. Unexpectedly, the mixture formed two phases, the upper phase being about four gallons of a thin hydrocarbon liquid whereas the lower phase being a viscous, preconcentrated gel-like cement. The cement could not be dispersed by turning on the agitator.

The treatment of the polymer cement with alcohol concentrated the cement to about 33% solids and about 67% of cyclohexane was extracted by only 5% of the nonsolvent that is normally required for complete precipitation.

EXAMPLE 2

This experiment demonstrates relative effectiveness of several nonsolvents used in concentrating a water-washed polymer cement at room temperature that had total solids of 17.6% and comprised a copolymer of 70/30 weight ratio of methyltetracyclododecene and methylnorbornene in cyclohexane reaction solvent. The copolymer had dilute solution viscosity of 0.78.

In carrying out the experiment, a nonsolvent was incrementally added with mixing to the polymer cement contained in a vessel until clear separation occurred yielding a two-phase system. Nonsolvent was added in one-tenth increments, based on the weight of the polymer cement in the vessel, and mixing was done by hand stirring. Determination of phase separation was done visually. Surprisingly, phase change was evident from the addition of the first increment of the nonsolvent to the addition of the final increment. Initially, the cement was a homogeneous liquid that went through an intermediate phase separation stages when a cloudy liquid and cement separated, to the final stage when clear phase separation took place with all of the suspended particles in the upper liquid phase precipitated to the lower preconcentrated cement phase. The final separation was instantaneous. The clear liquid in the upper phase was decanted and the preconcentrated cement in the lower phase was tested for total solids. Table I, below, sets forth results obtained using several nonsolvents to preconcentrate the polymer cement. The volume percent of nonsolvent used at final concentration is based on volume of the polymer cement treated and percent total solids (TS) indicates solids concentration of the lower phase containing the preconcentrated cement.

TABLE I

| Nonsolvent | Volume % of Nonsolvent Used | % TS of Preconc. Cement |
| --- | --- | --- |
| Methanol | 100 | 27.5 |
| Ethanol | 35 | 32 |
| Ethanol-Water Azetrope (96/4 by weight) | 45 | 28.7 |
| Isopropanol | 35 | 32 |
| Isopropanol-Water Azetrope (87.4/12.6 by weight) | 45 | 28.1 |

The above results demonstrate that methanol is not as effective for polymer cement preconcentration as are the other nonsolvents tested. It required a 1/1 ratio by volume of methanol to polymer cement to preconcentrate the polymer cement from 17.6% to 27.5% total solids whereas only from 35% to 45% of ethanol, isopropanol, and their azetropes, was needed to preconcentrate the polymer cement and degree of concentration was greater than with methanol although more than twice as much methanol was used.

EXAMPLE 3

Effectiveness of removing impurities, i.e., essentially oligomers, from polymer cements is demonstrated herein using small as opposed to large volumes of a nonsolvent at room temperature.

In the first part of the experiment, the cement used was the polymer cement described in Example 1 containing about 15% solids wherein the hydrocarbon liquid was essentially cyclohexane solvent and ethanol nonsolvent. Amount of the ethanol nonsolvent used for the preconcentration step was 35% by volume to 100% by volume of polymer cement. The polymer cement was evaporated to recover the oligomers.

In the second part of this experiment, the polymer cement of Example 1 was mixed with ethanol in the respective ratio of 100% to 600% by volume causing the polymer to precipitate in fluffy, clumpy mass of tangled microfibers. As was already disclosed, the high polymers in the polymer cement appear to preferentially precipitate from whereas the oligomers remain in the alcohol-rich liquid phase due to their solubility difference. To recover the oligomers, the precipitated polymer was removed and the remaining hydrocarbon liquid was evaporated leaving the oligomers and other impurities behind.

In both instances, the liquid was evaporated in a rotating flask heated to 70° C. in a hot water connected to a vacuum source of 20 mm of mercury. The evaporated liquid was recovered and condensed. As evaporation proceeded, the liquid gradually changed in color from crystal clear to brown. At the end of evaporation, these remained brownish viscous materials at bottom of the flask. The residue was then further dried in a 20 mm Hg oven at 135° C. for 2 hours. No residual monomers were expected at this point. The residues were believed to be a mixture mostly of oligomers with a trace of antioxidant and low molecular weight substances. Oligomers are low molecular weight polymers of molecular weights of less than 10 repeating monomer units. Results are given in Table II, below, where amount of extracts or residue is given in parts per hundred parts of polymer (phr).

TABLE II

| Liquid Phase | Extract, phr |
| --- | --- |
| Preconcentrated System | |
| Ethanol/Cement, 35/100% by Volume | 0.65 |

TABLE II-continued

| Liquid Phase | Extract, phr |
| --- | --- |
| Precipitation System | |
| Ethanol/Cement, 600/100% by Volume | 0.72 |

The above data indicates that extraction of impurities was at about the same level for the two systems compared. It is surprising that 35% ethanol extracted about the same amount of impurities as 600% ethanol, indicating unusual effectiveness of the nonsolvent to remove impurities at a level where separation of the phases is also achieved.

EXAMPLE 4

This experiment demonstrates preconcentration at an elevated temperature of 60° C.

In carrying of the preconcentration, 100 parts of a polymer cement at 60° C. and 40 parts of a nonsolvent also at 60° C. were added to a Waring blender and mixed for one minute or less. On volume basis, amount of cement was 71.5% and that of the nonsolvent, 28.5%. The cement was honey-like and contained 15% total solids in cyclohexane. The polymer in the cement was a copolymer of methyl tetracyclododecene (MTD) and methylnorbornene (MNB) at 90/10 weight ratio having dilute solution viscosity (DSV) of 0.62. The nonsolvent was an isopropanol-water azetrope in the respective weight ratio of 88/12. After mixing, the mixture from the blender was poured into a vessel that was placed in a water bath maintained at 60° C. and held there overnight, for about 16 to 18 hours. The mixture separated into two phases overnight, with the preconcentrated cement phase containing 35.1% total solids in the lower phase.

This experiment was repeated at the same conditions except 60 parts of the same 88/12 isopropanol-water nonsolvent was used. In this instance, amount of cement was 62.5% by volume and that of the nonsolvent was 37.5%. The total solids of the preconcentrated cement was 39.1%.

EXAMPLE 5

This experiment was conducted to determine time of phase separation of preconcentrations carried out at 25° C. and 60° C.

Same cement and nonsolvent were used here as in Example 4, in amounts of 100 parts of the cement and 40 parts of the nonsolvent. Preconcentration of Sample A was carried at room temperature, i.e., 20° to 25° C., whereas preconcentration of Sample B was carried out at 60° C. in a water bath. For purposes of clarity, results of the preconcentrations are tabulated below:

TABLE III

| | Sample A | Sample B |
| --- | --- | --- |
| Precon. Temp. | 20-25° C. | 60° C. |
| T.S. of Precon. Phase | 23.3% | 33.0% |
| Phase Seper. Time | 89 min. | 1 min. |
| Degree of Precon. | 84% | 86% |

The above table demonstrates that preconcentration at 60° C. was much quicker than at 20°-25° C. At 60° C., preconcentration to 33.0% was achieved in about 1 minute whereas at 20°-25° C., it took 89 minutes to reach 23.3% total solids in the preconcentrated cement phase. Degree of preconcentration is a measure of phase separation effectiveness in the given time. It was obtained by allowing Samples A and B to stand overnight at room temperature and at 60° C., respectively, and then determining amount of additional phase separation that took place on standing. In case of Sample A, standing overnight produced an additional 16% of the preconcentrated cement phase whereas the corresponding figure for Sample B was 14%. Simply stated, degree of phase preconcentration is based on a 100% preconcentration achieved on standing overnight.

EXAMPLE 6

This example illustrates the use of other nonsolvents in preconcentrating at room temperature a polymer cement containing 15% total solids. The cement comprised the copolymer of a 90/10 MTD/MNB having DSV of 0.64 in cyclohexane. Amount of the cement was 100 parts in each case.

The preconcentrations were carried out by mixing the polymer cements with the various nonsolvents in a Waring blender for one minute or less and allowing the mixture to stand overnight. The next day, the preconcentrated cement phase was separated and total solids thereof determined. Phase separation was obtained in all instances except one. Identification of the nonsolvents used, and amounts thereof, is given in the table, below, together with the results:

TABLE IV

| Nonsolvent | Wt. Parts Nonsolvent Used | % T.S. |
| --- | --- | --- |
| Acetone | 30 | 18.7 |
| Acetone | 100 | 45.3 |
| Ethyl Acetate | 30 | no phase separation |
| Ethyl Acetate | 100 | 31.4 |
| Glacial Acetic Acid | 30 | 15.6 |
| Glacial Acetic Acid | 100 | 28.7 |
| Ethyl Acetate/Methanol Azetrope (51/49 by wt.) | 30 | 18.9 |
| Ethyl Acetate/Methanol Azetrope (51/49 by wt.) | 100 | 43.1 |

The results set forth above demonstrate effectiveness of the several nonsolvents that were used at different levels to preconcentrate the polymer cement. At 30 parts of acetone per 100 parts of the cement, preconcentration was marginally effective in increasing total solids of the preconcentrated cement phase from 15% to only 18.7%. When amount of acetone was increased to 100 parts, total solids dramatically increased to 45.3%. Only in the case of ethyl acetate nonsolvent at 30 parts, there was no phase separation and, therefore, preconcentration was not achieved. Very little preconcentration was also obtained with glacial acetic acid at 30 parts where total solids obtained was only 15.6. At 100 parts of glacial acetic acid, a preconcentrated cement phase was obtained that contained 28.7% total solids. Interestingly enough, due to the differences in the density of materials, there was a phase inversion when glacial acetic acid was used as the nonsolvent that was not that evident at 30 parts of the acetic acid but was clearly evident at 100 parts of the acetic acid, with the preconcentrated cement phase being on top and a thin hydrocarbon phase on the bottom. The other preconcentrations followed the general rule of the preconcentrated cement phase being below the thin hydrocarbon phase, on phase separation.

We claim:
1. Process for preconcentrating a polymer cement that is a solution of a polymer prepared by ring opening polymerization in a nonpolar hydrocarbon solvent of at least one monomer containing the norbornene group shown below,

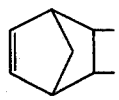

said process comprising mixing with said polymer cement a hydrocarbon nonsolvent in an amount sufficient to cause formation of separate phases but an insufficient amount to precipitate said polymer, and separating said phases; one of said phases being a preconcentrated polymer cement that is more viscous and contains a substantially larger proportion of solids than said polymer cement, and said nonsolvent being miscible with said nonpolar solvent but said polymer being insoluble in said nonsolvent.

2. Process of claim 1 wherein said nonsolvent is a liquid selected from alcohols of 1 to 8 carbon atoms, carboxylic acids containing 2 to 8 carbon atoms, ketones of 3 to 12 carbon atoms, aledhydes of 2 to 6 carbon atoms, acetates of 3 to 8 carbon atoms, and mixtures of said nonsolvents with and without water; amount of said nonsolvent being 5 to 100 parts by volume per 100 parts by volume of said polymer cement.

3. Process of claim 2 wherein said nonsolvent is selected from lower alcohols of 1 to 4 carbon atoms, lower monocarboxylic acids containing 2 to 4 carbon atoms, ketones of 3 to 5 carbon atoms, aldehydes of 2 to 4 carbon atoms, acetates of 3 to 6 carbon atoms, and mixtures of said nonsolvents with and without water; amount of said nonsolvent being 20 to 60 parts by volume per 100 parts by volume of said polymer cement that is of a honey-like consistency.

4. Process of claim 2 wherein amount of said nonsolvent is sufficient to obtain a distinct separation of phases, amount of said nonpolar solvent extracted by said nonsolvent from said polymer cement being more than one-half on volume basis, solids concentration of said polymer cement is about 15% whereas solids concentration of said lower phase is greater than 20%.

5. Process of claim 4 wherein said polymer has dilute solution viscosity of about 0.1 to 3 and is selected from homopolymers, copolymers and terpolymers of methylnorbornene, methyltetracyclododecene and dicyclopentadiene, the preconcentration being accomplished in the temperature range from above freezing to below boiling temperatures of the system.

6. Process of claim 5 wherein said copolymers contain 10 to 30% by weight polymerized methylnorbornene with remainder being methyltetracyclododecene and said terpolymers contain 1 to 45% by weight polymerized methylnorbornene, 50 to 98% by weight polymerized methyltetracyclododecene, with remainder being polymerized dicyclopentadiene; the temperature of said polymer cement and said nonsolvent on mixing is in the range of about 20° to 60° C.

7. Process of claim 4 wherein separation of phases results in formation of an upper phase of a thin hydrocarbon liquid and a lower phase of said preconcentrated polymer cement wherein said thin hydrocarbon liquid comprises said nonsolvent, more than one-half of said nonpolar solvent in the system, and impurities, said process including the step of conveying said upper phase to a solvent recovery operation to recover said nonpolar solvent and said nonsolvent.

8. Process of claim 7 including the step of mixing said lower phase with 500 to 1500 parts by volume of said nonsolvent per 100 parts by volume of said preconcentrated polymer cement to cause said polymer to precipitate, said step of mixing said polymer cement with said nonsolvent being accomplished by passing said polymer cement and said nonsolvent counter-currently to each other.

9. Process of claim 7 wherein said lower phase is mixed at least one more time with said nonsolvent in amount of about 20 to 60 parts by volume per 100 parts by volume of said lower phase to cause phase separation, and separating said phases whereby a preconcentrated polymer cement is obtained containing up to about 80% solids.

10. Process of claim 4 wherein said nonsolvent is selected from ethanol, isopropanol, water azetropes thereof, and mixtures of said nonsolvents; and amount of said nonsolvent is 20 to 60 parts by volume per 100 parts by volume of said polymer cement, said polymer has dilute solution viscosity of about 0.1 to 3 and is selected from homopolymers, copolymers and terpolymers of methylnorbornene, methyltetracyclododecene and dicyclopentadiene.

* * * * *